Patented Nov. 29, 1932

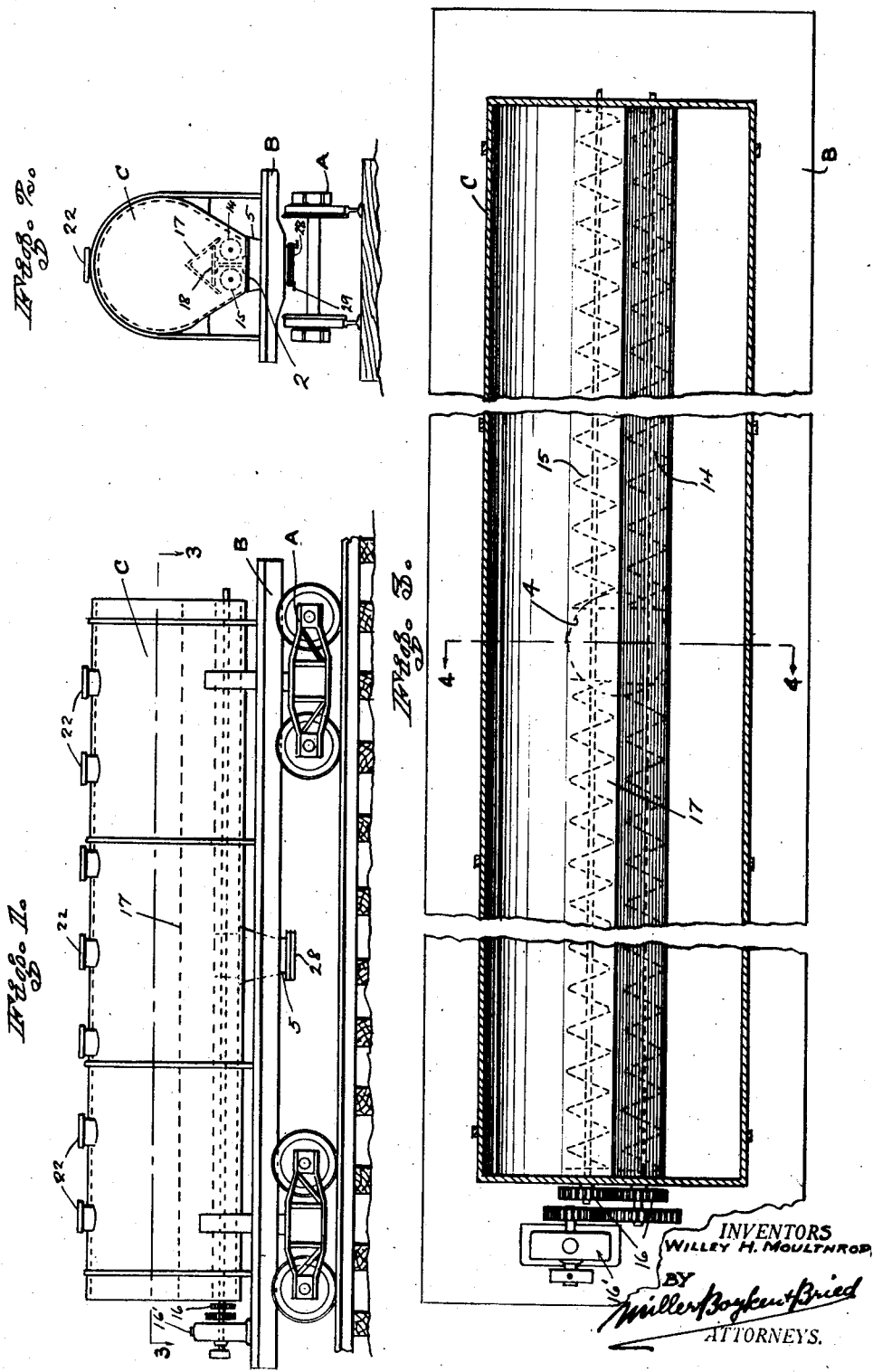

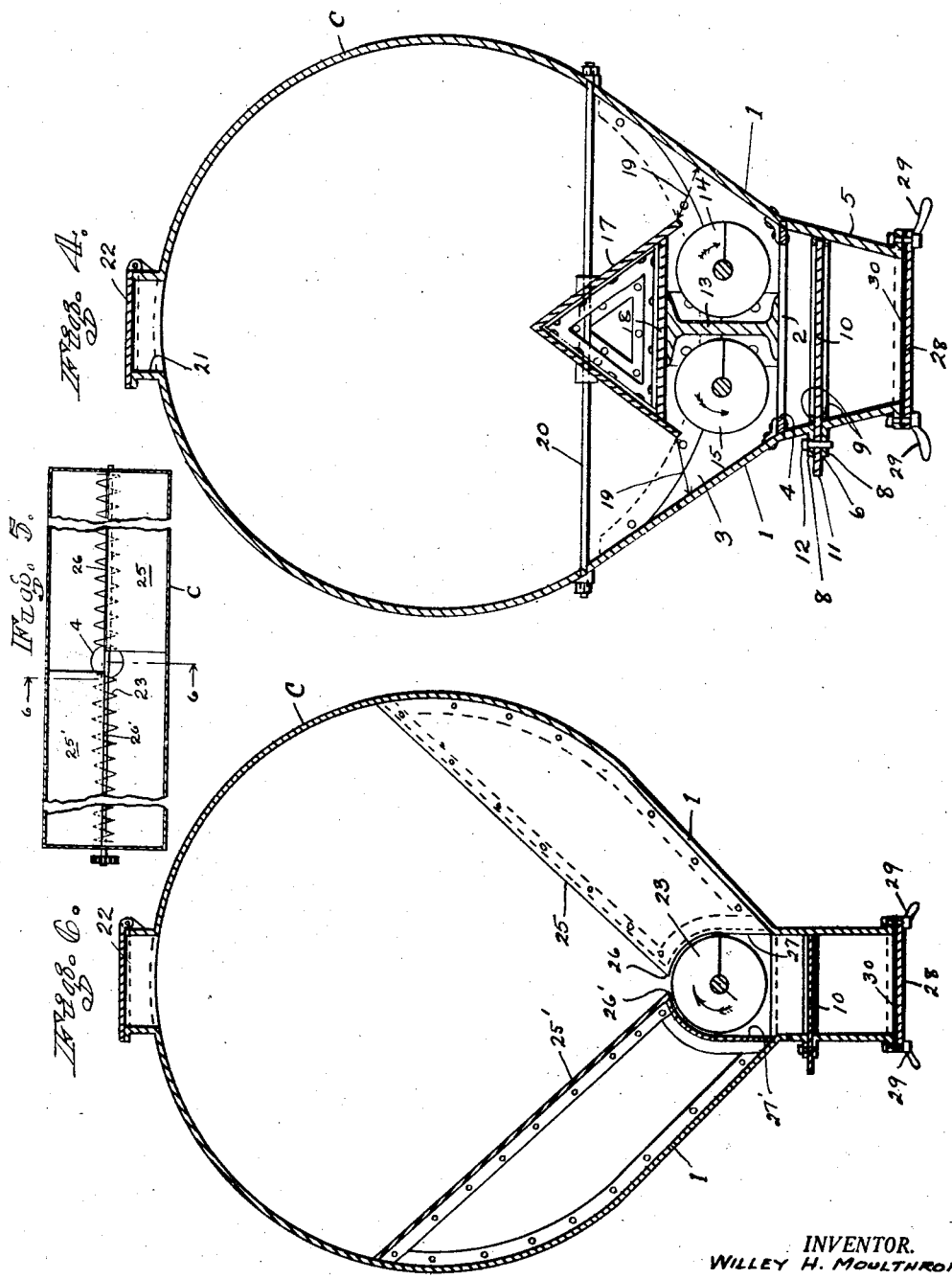

1,889,562

UNITED STATES PATENT OFFICE

WILLEY H. MOULTHROP, OF SAN FRANCISCO, CALIFORNIA

METHOD OF AND APPARATUS FOR TRANSPORTING PULVERIZED SUBSTANCES

Application filed August 27, 1929. Serial No. 388,711.

This invention relates to a method for transporting pulverized substances and provides an apparatus for the same.

The specific purpose of this invention is to provide a method for transporting cement. But it is obvious that the same method and the same apparatus may be utilized for shipping any pulverized or granular substance such as flour or sugar or similar commodities.

Briefly described my invention consists in utilizing tank cars, suitably equipped with mechanical unloading apparatus for transporting cement in bulk.

By taking on a load of cement in bulk, transporting it in bulk and unloading it in bulk the following savings are made:

First to the manufacturer.
Second to the consumer.
Third to the transportation companies.

An analysis of the saving to the manufacturer reveals the following:

1. Saving in royalty on sacking method (Bates equipment).
2. Saving in sacking and weighing operations.
3. Saving in storage plants.
4. Saving in investment in sacks.
5. Saving in time and labor in loading and unloading operation.
6. Saving in loss of cement.
7. Saving in equipment for dust collection.
8. Saving in overhead expenses.

The above savings are obvious and are made possible only by shipping in bulk.

The consumer's saving is still greater and may be analyzed as follows:

1. Saving in storage plants.
2. Saving in investment in sacks.
3. Saving in time and labor in unloading.
4. Saving in loss of cement.
5. Saving in freight on sacks to and from cement mills.
6. Saving in simplified operation during rainy season, with a consequent saving of demurrage charges on cars.
7. Saving in cost of cement (approximately 10¢ to 20¢ per barrel).

The saving in storage plants is due to the fact that storage bins only are used and no large warehouse is needed.

The simplified operation consists in spotting the car over the opening to the bin and unloading the contents therein by means of the mechanical unloader. Whether the season is rainy or dry is immaterial as to damaging the cement from the humidity of the air since the cement itself is in no way exposed to atmospheric contact, but is drawn from underneath the car and passes directly into the open chute of the bin below or it may fall into an elevator and be carried up into higher bins or it may be carried by suction pipes to points at a considerable distance from the car. From which it is seen there is no delay and consequently no demurrage charges incurred by waiting for a propitious day in which to unload the car of cement as often happens when the cement in sacks must be handled in the open from the car to the warehouse.

The other savings above mentioned are self-evident and require no amplification.

The third saving which is made by the transportation companies is of considerable importance and can be analyzed as follows:

1. Saving in investment in rolling stock.
2. Saving in claims for cement damaged by hydration in shipment.
3. Saving in maintenance, responsibility and administration.
4. Saving in better utilization of box cars for shipping other commodities.
5. Saving in cleaning of box cars after being used for cement haul.
6. Saving due to increased ton mile haul.

The savings as shown by the foregoing analysis are obvious to anyone skilled in the art of transporting cement and particularly to anyone transporting cement by the present method of sacking, or of lining a box car and shipping it in bulk.

Another feature of my method resides in the fact that existing tank cars may be readily converted into cement cars by changing only the under side of the tank and adding the unloading machine thereto.

With these points in mind recourse is now had to the accompanying drawings in which—

Fig. 1 is a side elevation of a tank car showing my invention installed;

Fig. 2 is an end elevation of the same;

Fig. 3 is an enlarged horizontal section on line 3—3 of Fig. 1;

Fig. 4 is an enlarged cross section on line 4—4 of Fig. 3;

Fig. 5 is a horizontal cross section of a modification showing one conveyor instead of two;

Fig. 6 is an enlarged cross section taken along the line 6—6 of Fig. 5.

In Fig. 1 is shown a railroad tank car equipped with standard railway trucks A which carry the platform B upon which is suitably mounted the tank C. This is all standard construction, and consequently no detail is shown of such.

In existing tank cars, the bottom of the tank is first cut through longitudinally along a line from end to end of the tank and the free edges thus formed are bent apart to form downwardly extending walls as at 1, said walls extending tangentially from the sides of the tank and convergent toward each other from the sides of the tank toward their free edges.

It will be seen that by altering an ordinary tank car in this manner, a slot-like opening is provided in the bottom of the tank from end to end thereof the lengthwise sides of the slots being the free edges of the sides of the tank. Over the opening thus formed I secure a base or bottom plate 2, which is shown in the drawings as being secured to the tank by rivets, although it is obvious that any suitable means could be employed, as bolts, or by welding, etc.

At the ends of the car I secure plates 3 to cover the open space in the ends caused by separating the cut edges of the bottom of the tank from the ends for forming the downwardly extending walls 1, these plates being formed substantially in continuation of the existing ends of the tank.

In the base 2 and at a point substantially central of the ends thereof, I provide an opening 4 over which I secure a downwardly extending chute 5. This chute may be secured to the base by any suitable means, such as welding or by bolting thereto. The sides of the chute are slightly tapered inward from the top to its lower end and is provided near its upper end with a horizontal slot 6 through one side thereof, the upper and lower edges of said slot being turned outward to form a pair of lips or flanges as at 8.

Adjacent the upper and lower edges of slot 6 and inside the chute adjacent the upper and lower edges of slot 6 is a pair of horizontally disposed rings or collars 9 secured around the sides of the chute in any suitable manner, the collars forming upper and lower guides across the inside of the chute for a gate 10 which is adapted to be inserted and withdrawn through slot 6 and to form a closure across the upper opening of chute 5 when it is in closed position.

One edge of gate 10 is provided with an extension 11 which extends through the slot 6 when the gate is in closed position said extension forming means for withdrawing the gate to permit ejection of contents of the tank through the chute and accidental lateral dislodgement of the gate through the slot 6 is prevented by locking means which comprises a bolt 12 adapted to be inserted through registering holes in the lips or flanges 8 and an opening in the extension 11 of the gate as indicated best in Fig. 4 of the drawings.

Resting on the base 2 on the medial line thereof and extending from end to end of the tank is an I beam 13 secured by rivets or other suitable means to the base 2 and at its opposite ends to the ends of the car respectively. On opposite sides of said I beam I provide a pair of screw conveyors 14 and 15, the shafts of said screw conveyors extending through the ends of the tank to the outside at their opposite ends respectively, suitable bearings being provided in the ends of the car for supporting the screw conveyor. Secured to one end of the screw conveyor shafts and outside the car are a pair of intermeshing gears 16 which are driven by any suitable means, in the drawings, Figs. 1 and 3 being shown as a pulley and gear arrangement as at 16' adapted for attachment of a belt driven by any suitable source of power not shown, such as a small gasoline engine or an electric motor.

In order to effect the movement of the contents of the car toward the chute 5, the opposite ends respectively of the screw conveyors 14 and 15 are reversed in their throw, the blades of the screw on said opposite ends extending from the ends of the car to a position slightly over the opening of chute 5 at their inner ends respectively as indicated in Fig. 3. The direction of rotation of the screw conveyors 14 and 15 respectively is preferably as indicated by the arrows in Fig. 4 or away from I beam 13 at the top.

In order that the contents of tank C does not rest directly on the screw conveyors 14 and 15, a baffle plate 17 in the shape of an inverted V in section, is positioned over them, said baffle plate extending from end to end of the tank and secured at its opposite ends to opposite ends of the tank respectively by any suitable means as indicated, and additional support for the baffle plate 17 along its length is provided by a horizontal plate 18 resting on and secured to the top of I beam 13 along its full length, said plate being secured along its lateral edges to the opposite inner sides of the inverted V-shaped baffle plate. The apex of the baffle plate 17 thus secured in place is directly over I beam 13, and in this position the contents of the tank is separated so that one-half is directed over one side of the baffle plate to the outer side of screw conveyor 14 while the other half of the contents is directed over the other side to the outer side of screw conveyor 15, the lower edges of the V-shaped baffle plate being spaced from opposite sides of the tank respectively as at 19 to permit free entry of the contents of the tank to the screw conveyors 14 and 15 along their length for movement toward chute 5 when the screw conveyors are rotated.

In order to insure the baffle plate structure against any possible lateral strains due to an excessive load of material on one side only, and to brace the sides of the tank, a series of tie rods 20 are secured across the narrow width of the tank from side to side and through the sides of the V-shaped baffle 17.

The top of the tank is provided with a plurality of openings 21 which are covered by hinged caps 22 forming a water-tight closure for said openings against the ingress of moisture to the inside of the tank when the tank is either empty or loaded.

In Fig. 6 a modification involving a single screw conveyor is shown. In this case the tank is formed substantially as in the preferred form except that the base 2 of the tank is narrower and the chute 5 has straight sides instead of tapered sides.

A single screw conveyor 23 is installed in the bottom of the tank, having two blades opposed in direction of throw at opposite ends thereof said blades extending from opposite ends of the tank respectively to a position slightly over chute 5 at their respective inner ends.

As a precaution against cement or other pulverized material packing around the screw conveyor, and locking it against rotation, I have provided aprons 25 and 25' respectively inclined at such an angle that the material in the tank will slide downward over them by gravity. These aprons are placed on alternate sides of the conveyor at opposite ends of the tank respectively and extend inward substantially to a point over chute 5 the lower edge of the aprons, indicated at 26, 26', being substantially over the medial line of the screw conveyor and just clearing it. The openings left under the aprons are closed by plates 27, 27', the upper edges of plates 27 and 27' being secured by any suitable means to the lower edges 26, 26' of the aprons 25 and 25' respectively by any suitable means and are shaped to conform to the shape of the screw conveyor and to just clear the edges of the blades so that no cement will accumulate beneath the aprons but will be forced along toward chute 5 when the screw conveyor 23 is rotated.

This construction keeps the main load of pulverized material off the screw conveyor itself and will prevent it from packing around the blades so as to prevent rotation of the conveyor. By altering the aprons on opposite sides at opposite ends of the tank, the load is balanced in the tank and the cement or pulverized material is admitted to the screw conveyor for movement toward the outlet chute in the bottom of the tank.

I have found in actual practice, that in transporting cement in tank cars as above described that a small amount of the cement sometimes sifts past the gate 10 in the chute 5 during transit, and in order to prevent any loss of cement in this manner, I provide a closure plate 28 over the bottom of chute 5, removably secured in place by means of suitable nuts and bolts as shown at 29, preferably interposing a gasket 30 between the plate 28 and the end of the chute 5 in order to insure against any possible leakage of the cement as well as providing a moisture-proof seal at this point.

It is obvious to anyone skilled in the art that the screw conveyors can be constructed to discharge the cement from one end of the tank only, or that a trough can be provided below the main bottom of the tank for the conveyors to operate in or that the entire apparatus can be mounted on a highway truck or trailer instead of on a railway car.

Any such variations as may come within the spirit of my invention are intended to be covered in the appended claims.

I claim:

1. A tank for transporting cement including an elongated, horizontally disposed, wheel mounted container, provided with an opening in the top and a centrally disposed opening in the bottom thereof, a pair of parallely disposed screw conveyors with horizontally aligned axes mounted in the bottom of the container superjacent said central opening and extending from end to end of the container, said screw conveyors arranged and adapted to force the cement from the ends of the container to said central opening and an inverted V-shaped baffle positioned above and covering said pair of screw conveyors from end to end arranged and adapted to support part of the weight of the cement in the container and to divide the cement in the container for delivery to lateral outer side of each of said screw conveyors respectively.

2. A tank for transporting cement including an elongated horizontally disposed, wheel mounted container provided with an opening in the top and a centrally disposed opening in the bottom thereof, a pair of parallel screw conveyors mounted in the bottom of the container disposed with their axes in a horizontal plane, said screw conveyors extending from end to end of the container and arranged and adapted to force the cement from the ends of the container toward the central opening, an inverted V-shaped baffle positioned above and covering said pair of screw conveyors for supporting a part of the weight of the cement in the container and arranged to divide the cement for delivery to the lateral outer side of each of said screw conveyors respectively, an I beam positioned between the pair of conveyors with its web vertical and its top and bottom laterally extending flanges on opposite sides thereof extending partially over and beneath each of the screw conveyors respectively to form longitudinally extending pockets on opposite sides of the I beam into which the adjacent sides of the conveyors extend.

3. In a structure as defined in claim 1, means for simultaneously rotating the right and left hand conveyor clockwise and counter clockwise respectively.

4. A tank for transporting cement comprising an elongated, horizontally disposed, wheel mounted container, the upper half of said container being semi-cylindrical in section and the lower half being trough shaped with a narrow bottom and straight sides inclined outwardly from each other toward their upper edges, which edges join with the edges of the semi-cylindrical upper half, closures across the ends of said container, a plurality of openings in the top of the container and a centrally disposed opening in the bottom thereof, operative means mounted in the bottom of the container for simultaneously forcing the cement from the ends of the container towards the central opening, and an inverted V shaped baffle supported on the container above and substantially covering said means, the free edges of said V shaped baffle being spaced from the inclined sides of the trough shaped lower half of the container.

WILLEY H. MOULTHROP.